United States Patent
Waagenaar

[11] Patent Number: 5,876,003
[45] Date of Patent: Mar. 2, 1999

[54] BRACKET FOR ATTACHING AUTOMOBILE LIGHT GUARD

[76] Inventor: Gary D. Waagenaar, 19806 Stagg St., Canoga Park, Calif. 91306

[21] Appl. No.: 891,906

[22] Filed: Jul. 14, 1997

[51] Int. Cl.[6] .................................................. F16M 11/00
[52] U.S. Cl. ...................................... 248/200; 248/205.3
[58] Field of Search .............................. 248/200, 205.1, 248/205.3, 316.7; 211/86, 89, 65

[56] References Cited

U.S. PATENT DOCUMENTS

| | | | |
|---|---|---|---|
| 3,409,257 | 11/1968 | Elm | 248/65 |
| 3,696,920 | 10/1972 | Lahay | 206/62.3 R |
| 3,702,612 | 11/1972 | Schlesinger | 128/350 R |
| 3,946,877 | 3/1976 | Galicia | 211/65 |
| 4,025,015 | 5/1977 | Kolic | 248/205 |
| 4,312,455 | 1/1982 | Weber | 211/86 |
| 4,962,907 | 10/1990 | Gary | 248/205.3 |
| 5,042,770 | 8/1991 | Louthan | 248/311.2 |
| 5,178,354 | 1/1993 | Engvall | 248/316.7 |
| 5,255,800 | 10/1993 | Kelly | 211/89 |
| 5,275,367 | 1/1994 | Frye | 248/205.3 |
| 5,456,437 | 10/1995 | Chander et al. | 248/316.7 |
| 5,484,066 | 1/1996 | Luisi | 211/69.8 |

*Primary Examiner*—Leslie A. Braun
*Assistant Examiner*—Tan Le
*Attorney, Agent, or Firm*—Gerald L. Price

[57] ABSTRACT

A bracket for attaching a vehicle rear light guard of the grill type which has a flat flexible base for conforming to a vehicle rear light lens for adhesive affixation thereto, and a relatively rigid semi circular portion for securely engaging a portion of the guard. The bracket is fabricated from a thermoplastic material by extrusion or molding with portions of two distinct durometer readings to provide the two distinct aforestated attributes.

2 Claims, 2 Drawing Sheets

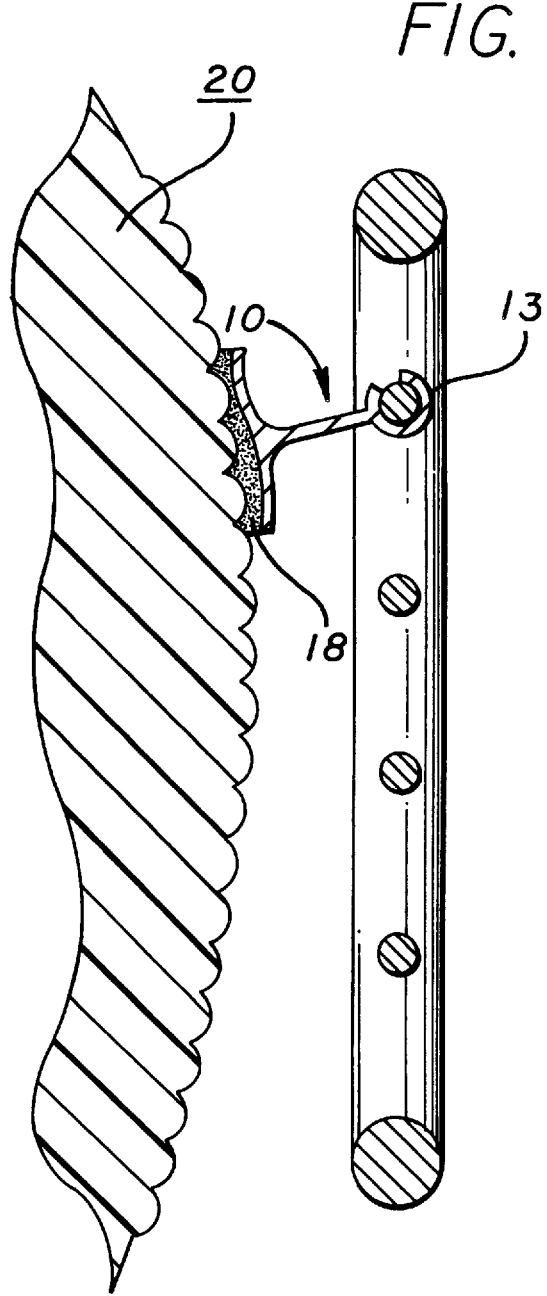

BRACKET FOR ATTACHING AUTOMOBILE LIGHT GUARD

BACKGROUND OF THE INVENTION

1. Field Of The Invention

This invention relates to automobile grill and light guards; and, more particularly, to a bracket for attaching rear and tail light guards to automobiles.

2. Description Of The Prior Art

In recent years an automobile with a body style referred to as sports-utility has become an industry term. This type of body style evolved from the family station wagon and the more A rugged and utilitarian vehicles that were based on the "Jeep" vehicle of World War II fame and special vehicles designed for safari and jungle and desert travel.

Today, virtually every brand of automobile marketed in the United States includes at least one style of sport utility vehicle in its product line. Because of a combination of both off road and heavy duty applications that some of these vehicles are utilized for, a number of optional after market and even original factory installed accessories have been made available for these sports-utility and similar vehicles and include racks, towing equipment, auxiliary lights and grill and light guards. While some of these accessories are actually installed as standard equipment on some of the more expensive models, there is a considerable demand for these products as an aftermarket or dealer installed accessory for both utilitarian and appearance purposes.

One such accessory category that has become extremely popular as a dealer or aftermarket installed accessory are grill and light guards. These guards basically comprise a heavy duty tubular frame that generally conforms to the contour of the front of the vehicle and to the taillight area of the rear of the vehicle. Within the tubular frame there is a grill comprised of a plurality of spaced rods that are configured to protect the taillights from brush and rocks yet still allow enough open space not to obstruct the lights.

SUMMARY OF THE INVENTION

It is an object of this invention to provide a new and improved bracket for mounting a rear or taillight guard to a vehicle.

It is another object of this invention to provide a bracket for attaching a rear light guard which can be utilized on a large number of different type vehicles with different rear light designs and configurations.

It is still another object of this invention to carry out the foregoing objects wherein the mounting afforded by such bracket is more secure, weather resistant and simple to install than has heretofore been available.

These and other objects are preferably accomplished by providing a bracket which is formed with one portion that securely and rigidly snaps onto or positively engages the rear light guard and another portion which is pliable and flexible to enable it to conform to the configuration of a rear light lens and be securely and adhesively attached thereto.

BRIEF DESCRIPTION OF THE DRAWINGS

FIG. 3 an illustration showing a section taken generally through the line 2—2 of Figure two, showing the bracket of the present invention utilized in attaching a rear light guard to a rear light lens.

DESCRIPTION OF THE PREFERRED EMBODIMENT

Figure 1:
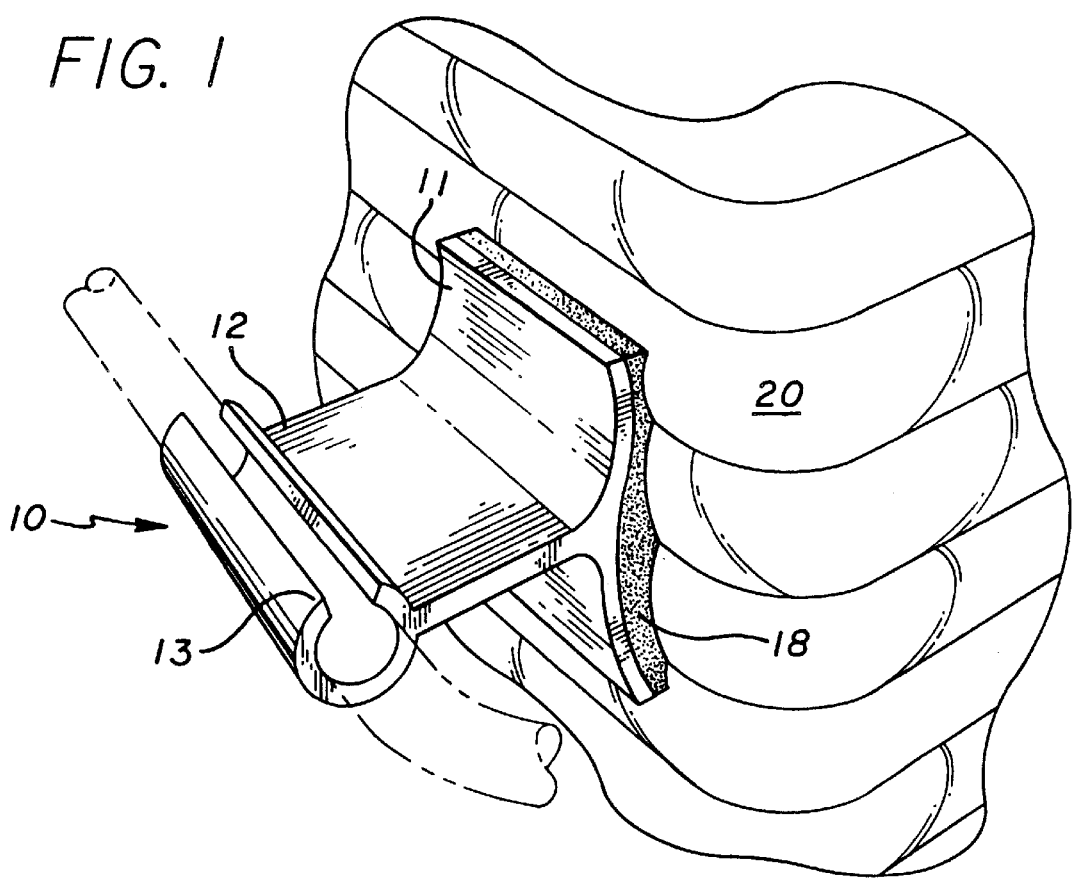
FIG. 1 is a perspective view of a bracket embodying the present invention.

Referring now to FIG. 1 of the drawing, a bracket shown generally at 10, is illustrated, having a base 11, a web portion 12 and a semi circular clip portion 13 attached to and spaced from the base 11 by the web 12.

Figure 2:
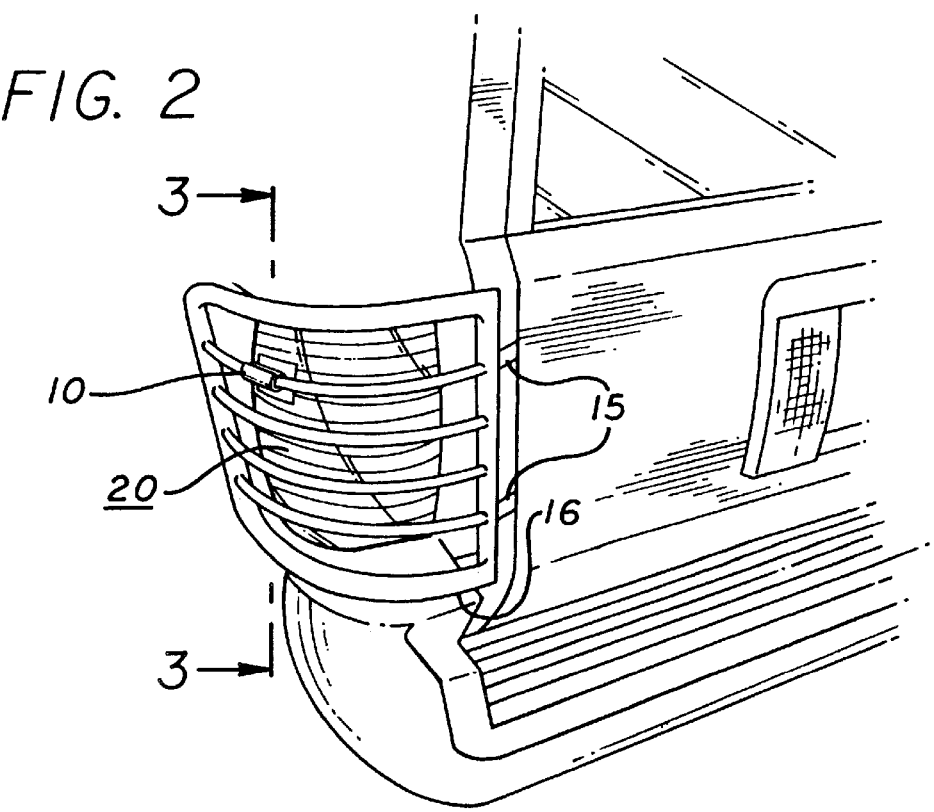
FIG. 2 is an illustration of a portion of the rear of a sport utility type vehicle illustrating the bracket of the present invention utilized in mounting a rear light guard.

In keeping with one of the objects of the invention, provision is made for the bracket of the present invention to be utilized in the installation in a large number of different vehicle and guard configurations. In general, most aftermarket rear light guards are mounted to its respective vehicle utilizing two areas of attachment. The first is a bracket or tab 15 permanently affixed to the rear of the guard 16 as shown in FIG. 2 and attached to the vehicle in the rear door frame utilizing sheet metal or self tapping screws. While this part of the installation provides a secure mounting with attachment points that are concealed when the rear door or hatch is closed, the problem in aftermarket installation arises with the forward mounting of the guard. In general, dealers and installers of aftermarket accessories are very reluctant to drill holes in finished portions of the vehicle body. One reason is that many vehicles are specially treated to resist rust and corrosion and drilling through a painted surface could result in compromising such treatment. In order to avoid a forward attachment using screws, rivets or other attaching means requiring drilling into a finished body panel, several methods have been employed to date, each with its own problems or limitations. Some manufacturers have provided forward attachment tabs or brackets that are secured to the vehicle body with double sided adhesive tape or Velcro material adhesively attached to both the vehicle surface and such forward mounting bracket or tab. Neither of these two methods have been without problems since the surface of a painted body section of a vehicle reaches such extremes in both hot and cold temperature, adhesively applied fastening simply does not hold up for any prolonged period.

Another method utilized in some designs is to let the entire mounting of the rear light guard be at the rear with secure mechanical fasteners hidden in the rear door or hatch frame. In this type of mounting, the guard is essentially cantilevered from the rear and designed to be biased toward and the vehicle body at the front with a resilient bumper provided therebetween to prevent finish damage or vibration. While this design provides satisfactory mounting in most situations, the protection at the forward portion of the guard is still not as secure as with reliable attachment means.

In the present invention the bracket 15 is designed to overcome the previously mentioned problems and limitations. As seen in FIG. 1, the base 11 of the bracket 10 is formed from very flexible thermoplastic material so that it will conform to the plastic lens of the rear light. It has been found that the plastic lens goes through a far less temperature range than metal or laminated plastic body panels so that a properly chosen adhesive will provide far more reliable service. It has been found that double sided foam base adhesive tape manufactured by the 3-M Corporation will provide long term and reliable service. As shown in FIGS. 1 and 3, the two sided foam base tape 18 secures the bottom of the flexible bracket base 11 to a plastic rear light lens 20.

In order to securely attach the top portion of the bracket 10 to the guard 16, it is formed in a semi circular configuration 13 and sized to securely snap onto one of the tubular members of the guard 16 as depicted in FIGS. 2 and 3. In order to provide a semi circular portion that will securely snap onto a guard member, it has been found that generally rigid thermoplastic material should be utilized. In order to provide such a generally rigid portion 13 and let still have a base portion 11 that is flexible to conform to the shape of a rear light lens, it has been found that the bracket 10 of the instant invention provides the required performance when it is molded or formed with a flexible base 11 and a generally rigid guard engaging portion 13. It is well known in both the thermoplastic molding and extruding art to form molded or extruded parts having portions with different durometer readings for rigidity and it is contemplated that such a procedure could be utilized in producing the within brackets embodying the instant invention.

There is thus described a bracket for installing a rear light guard on a vehicle. Obviously, variations thereof may occur to any artisan and the scope of the invention should only be considered to be limited by the scope of the appended claims.

I claim:

1. A one-piece plastic bracket for mounting a rear light guard to a vehicle for protecting the lens of said vehicle's light comprising:

a base portion having a generally flat flexible surface, a generally substantially planar, rigid web portion having a first and second end, said web portion being secured along said first end and extending outwardly from a first surface of said flexible surface, and a generally rigid semicircular cross sectional shaped guard gripping member secured along the second end of said rigid web portion, said flat flexible surface having adhesive means on a second surface of said flat flexible surface, whereby said flexible surface is adapted to conform to the shape of a vehicle light lens and said gripping member is adapted to retain a rear light guard therein for protecting the lens of said light.

2. The bracket of claim 1 wherein said bracket is formed in an integral piece from a thermoplastic material having at least two distinct durometer values between the base and the side portions with the base portion being softer and more flexible.

* * * * *